United States Patent

Hashimura et al.

Patent Number: 5,385,192
Date of Patent: Jan. 31, 1995

[54] PNEUMATIC TIRE WITH DIFFERENT SIDE WALL THICKNESS IN TREAD-SIDE AND BEAD-SIDE REGIONS

[75] Inventors: Yoshiaki Hashimura, Isehara; Masakazu Okihara, Hiratsuka; Yusaku Miyazaki, Hiratsuka; Zenichiro Shida, Hiratsuka; Tomohiko Kogure, Minami Ashigara, all of Japan

[73] Assignee: The Yokohama Rubber Co., Ltd., Tokyo, Japan

[21] Appl. No.: 2,343

[22] Filed: Jan. 6, 1993

[30] Foreign Application Priority Data

Jan. 22, 1992 [JP] Japan .................................. 4-009220

[51] Int. Cl.⁶ .................... B60C 3/00; B60C 13/00; B60C 13/02
[52] U.S. Cl. ......................... 152/454; 152/523; 152/525
[58] Field of Search ............... 152/454, 523, 525, 524; D12/152

[56] References Cited

U.S. PATENT DOCUMENTS

| | | | |
|---|---|---|---|
| 1,575,966 | 3/1926 | Brittain | 152/525 |
| 2,657,730 | 11/1953 | Cuthbertson et al. | 152/525 |
| 2,874,746 | 2/1959 | Nichols | D12/152 X |
| 4,266,995 | 5/1981 | Kitazawa et al. | 152/525 X |
| 4,947,913 | 8/1990 | Kaba et al. | 152/523 |
| 5,205,880 | 4/1993 | Iida et al. | 152/523 X |

FOREIGN PATENT DOCUMENTS

| | | | |
|---|---|---|---|
| 0481687 | 4/1992 | European Pat. Off. | 152/523 |
| 1210935 | 11/1970 | United Kingdom | 152/523 |

OTHER PUBLICATIONS

*Mechanics of Pneumatic Tires,* ed. Samuel Clark: U.S. Department of Transportation, Aug. 1981, p. 881.

Primary Examiner—Michael W. Ball
Assistant Examiner—Adrienne C. Johnstone
Attorney, Agent, or Firm—Nikaido Marmelstein, Murray & Oram

[57] ABSTRACT

A pneumatic tire characterized in that an average thickness $G_U$ of the region of each of side walls which extends from a position corresponding to a widest portion of the tire toward a tread and that $G_L$ of the region of the side wall which extends from the same position toward a bead are set different from each other, the average thickness $G_U$ of the tread-side region being set to not less than 2.5 mm with the average thickness $G_L$ of the bead-side region set to less than 2.5 mm and not less than 1.0 mm.

5 Claims, 4 Drawing Sheets

PNEUMATIC TIRE WITH DIFFERENT SIDE WALL THICKNESS IN TREAD-SIDE AND BEAD-SIDE REGIONS

BACKGROUND OF THE INVENTION

This invention relates to a pneumatic tire the weight of which is reduced by minimizing the thickness of the side walls thereof.

In recent years, great importance has been attached to the reduction of the weight of a vehicle which forms a part of the measure to improve the environment on the earth, and the reduction of the weight of a pneumatic tire as well has strongly been demanded. The construction of a pneumatic tire for passenger cars will now be discussed. As shown in FIG. 8, a ratio (SDH/SH) of the height SDH of a position W corresponding to a cross-sectionally widest portion of a tire to that SH of a cross section of the tire is about 0.5, and the thickness G (measurement between the outer surface of a carcass 1 and that of a side wall) of a side wall 2 is within the range of about 2.8–4.0 mm and uniform. Uniformly reducing the thickness G of the side wall 2 may be thought of as one of the methods of reducing the weight of such a pneumatic tire.

However, when a wheel having a tire the thickness G of the side walls 2 of which is reduced uniformly by not less than a certain level runs onto an edge stone, a side wall 2 becomes liable to be easily broken. Therefore, there is a limit to the reduction of the weight of the side walls.

SUMMARY OF THE INVENTION

An object of the present invention is to provide a pneumatic tire which can be formed to a smaller weight without reducing the cutting resistance of the side walls.

A pneumatic tire according to the present invention developed so as to achieve this object is characterized in that an average thickness $G_U$ of the region of a side wall which extends from a position corresponding to a widest portion of the tire toward a tread and that $G_L$ of the region of the side wall which extends from the same position toward a bead are set different from each other, the average thickness $G_U$ of the tread-side region being set to not less than 2.5 mm with the average thickness $G_L$ of the bead-side region set to less than 2.5 mm and not less than 1.0 mm.

The inventors of the present invention have discovered that the damage to a side wall which occurs when a wheel runs onto an edge stone is concentrated on the region thereof which extends from a position corresponding to a widest portion of the tire toward the tread thereof. An average thickness $G_U$ of the tread-side region of a side wall is then set to not less than 2.5 mm to secure the thickness of rubber substantially equal to that of rubber of the same portion of a side wall of a conventional tire of this kind, while an average thickness $G_L$ of the bead-side region of the side wall is set to less than 2.5 mm and not less than 1.0 mm, whereby the thickness of this region of the side wall is set much smaller than that of the corresponding portion of a side wall of a conventional tire. This enables the weight of a pneumatic tire to be reduced without causing a decrease in the cutting resistance of the side walls.

DETAILED DESCRIPTION OF THE PREFERRED EMBODIMENTS

Figure 1:
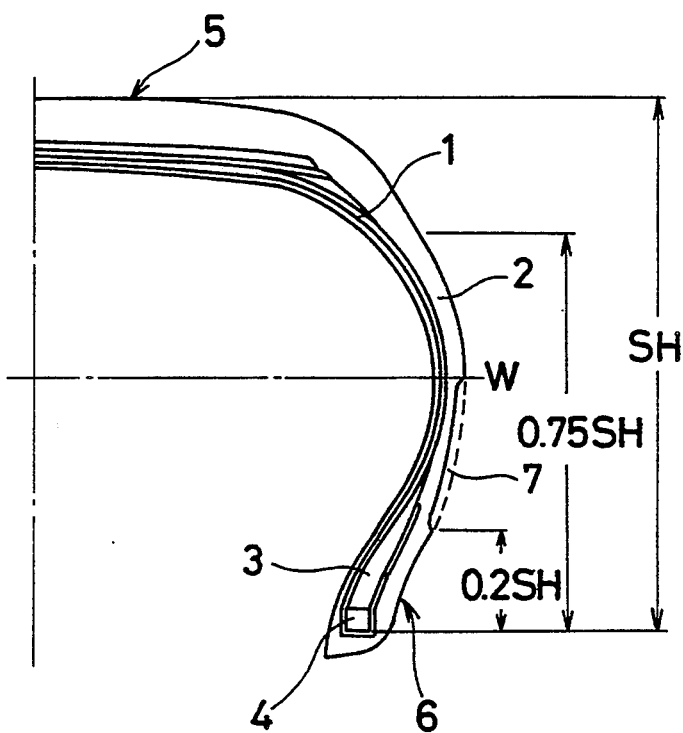
FIG. 1 is a sectional view of the pneumatic tire according to the present invention.

Referring to FIG. 1, a reference numeral 1 denotes a carcass, 2 a side wall, 3 a bead filler, 4 a bead core, 5 a tread, and 6 a bead portion. The carcass 1 is provided on the inner side of the side wall 2 and turned up at both end portions thereof around the bead cores 4 from the inner side of the tire to the outer side thereof, and each of the folded portions of the carcass is disposed along the bead filler 3. The side wall 2 is provided with a stepped portion at the part thereof which corresponds to a position W of a widest portion of the tire, and a recess 7 is formed in a bead-side region extending from the stepped portion to the bead portion 6. The thickness of the side wall 2 shall be defined as a measurement between the outer surface of the carcass 1 and that of the rubber of the side wall 2. The average thicknesses of the tread-side region and bead-side region, which extend above and below the position W of a widest portion of the tire, of the side wall 2 formed as described above are different. An average thickness $G_U$ of the region of the side wall 2 which extends from the position W of a widest portion of the tire toward the tread is set to $G_U \geq 2.5$ mm. An average thickness $G_L$ of the region of the side wall 2 which extends from the position W of a widest portion of the tire toward the bead is set to 2.5 mm $> G_L \geq 1.0$ mm.

The weight of a pneumatic tire can be reduced to a level lower than that of the weight of a conventional pneumatic tire by thus reducing the thickness of a bead-side region which is rarely damaged of a side wall 2. When an average thickness $G_U$ of the tread-side region of the side wall 2 is less than 2.5 mm in this case, the cutting resistance of the side wall lowers, and the side wall becomes liable to be broken. However, in view of the necessity of reducing the weight, it is preferable that $G_U$ be set to 2.5–2.8 mm. When an average thickness $G_L$ of the bead-side region of the side wall 2 is not less than 2.5 mm, the reduction of the thickness of this region does not lead to that of the weight of the side wall 2. When the average thickness $G_L$ is less than 1.0 mm, the cutting resistance of even the bead-side region lowers, and the side wall 2 becomes liable to be easily cut.

Figure 2:
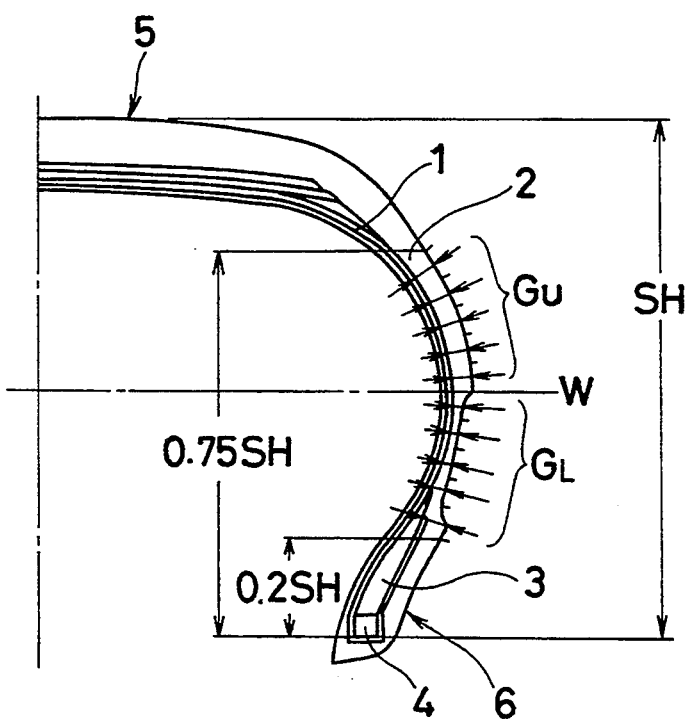
FIG. 2 is a sectional view showing a method of measuring average thickness of a side wall of the pneumatic tire according to the present invention.

According to the present invention, the average thickness $G_U$, $G_L$ of the side wall 2 are determined in accordance with what is shown in FIG. 2. Namely, the portion of the side wall 2 which is on the upper side of the inner edge of the bead core 4, and which has a height 20–75% as large as that SH of a cross section of the tire, is divided into ten equal parts so that a tread-side region extending upward from a position W of a widest portion of the tire and a bead-side region extending downward from the same position W have five equal divisional parts respectively, and the thickness of rubber of each divisional part is measured along a line which passes a circumferentially intermediate point in each divisional part and reaches the surface of the carcass 1, bead filler 3 or other composite member at right angles thereto. An average of the thickness of the side wall 2 at the five points in the tread-side region shall be represented by $G_U$, and an average of the thickness thereof at the five points in the bead-side region $G_L$.

Figure 3:
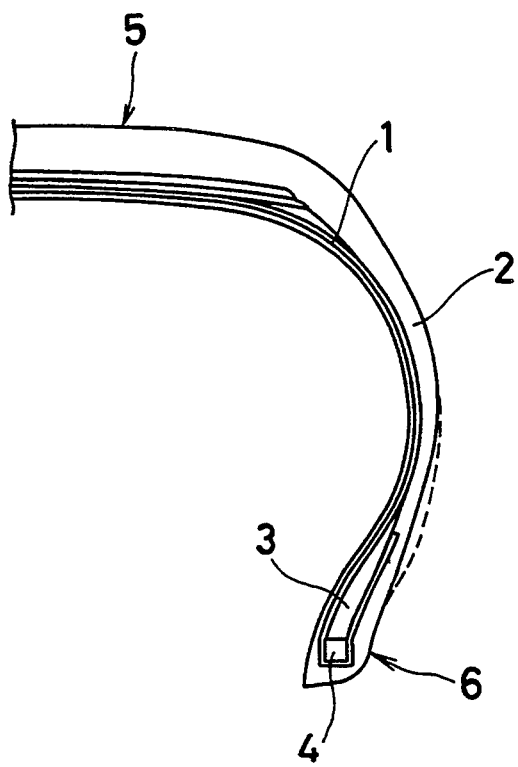
FIG. 3 is a sectional view of a modified example (stepped portion is not provided on a side wall) of the pneumatic tire according to the present invention.
Figure 4:
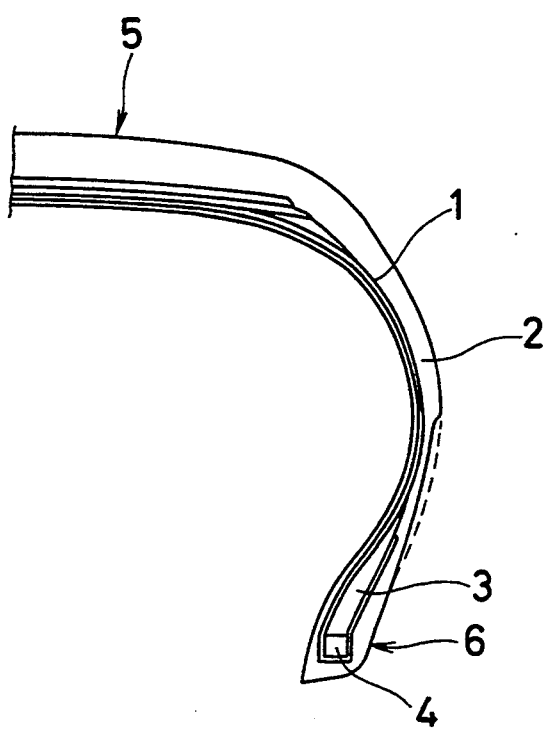
FIG. 4 is a sectional view of a modified example (stepped portion is provided on a side wall) of the pneumatic tire according to the present invention.
Figure 5:
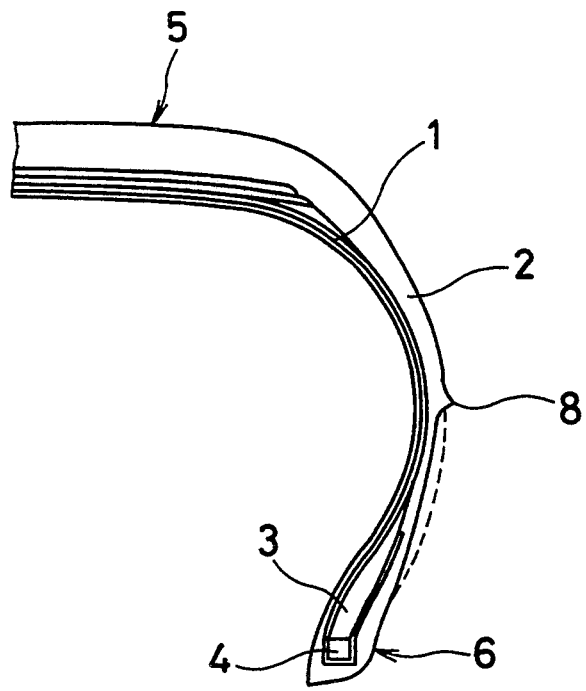
FIG. 5 is a sectional view of a modified example (protective bar is provided on a side wall) of the pneumatic tire according to the present invention.
Figure 6:
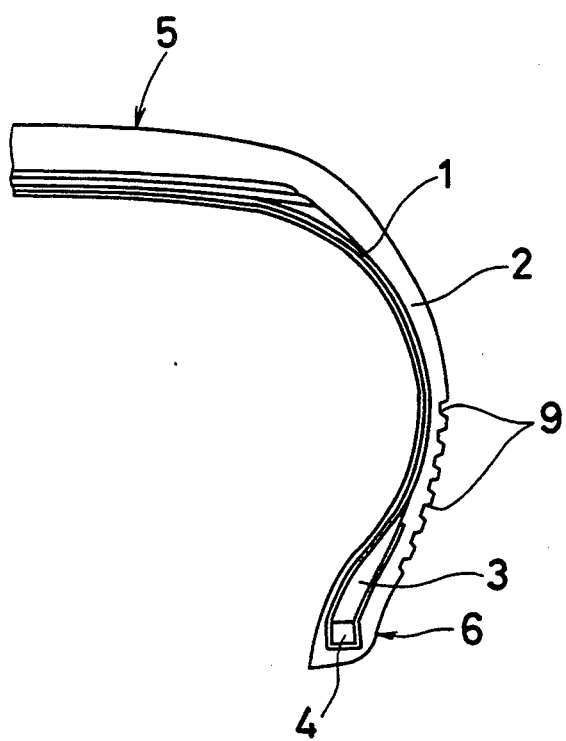
FIG. 6 is a sectional view of a modified example (grooves are provided in a side wall) of the pneumatic tire according to the present invention.

The pneumatic tire according to the present invention may be a tire which satisfies the average thicknesses $G_U$, $G_L$ determined under these measuring conditions, and the shape of the outer surface of the side walls 2 is not specially limited. For example, the side wall 2 may be formed without providing a stepped portion thereon, in such a manner that the bead-side region thereof has a gradually decreasing average thickness $G_L$ as shown in FIG. 3, or the side wall 2 may be provided with a stepped portion so as to reduce the average thickness $G_L$ as shown in FIG. 4. The side wall 2 may be provided with a rib type protective bar 8 on the portion of the outer surface thereof which corresponds to a position W representative of a widest portion of the tire, in such a manner that the protective bar 8 extends in the circumferential direction of the tire as shown in FIG. 5. When such a protective bar 8 is provided, the cutting resistance of the side wall 2 can be improved. The side wall 2 may also be provided with a plurality of grooves 9 so as to extend in the circumferential direction of the tire in the bead-side region as shown in FIG. 6, in such a manner that the side wall 2 has an uneven cross-sectional shape, whereby the average thickness $G_L$ is reduced. In order to provide a stepped portion of not less than 5 mm between the tread-side and bead-side regions of the side wall 2, it is preferably formed in the range of the side wall which is on the upper side of the inner edge of the bead core 4, and which has a height 20–60% as large as that SH of a cross section of the tire, in view of the cutting resistance of the side wall 2.

According to the present invention, it is desirable that the side wall be formed out of rubber having a loss factor tan δ of 0.05–0.30. Especially, in order to improve the cutting resistance of the side wall 2, the loss factor tan δ is preferably set to 0.13–0.30. These loss factors tan δ are values obtained by conducting measurement at a temperature of 20° C. and a frequency of 20 Hz and with initial strain of 10% and dynamic strain of ±2%.

According to the present invention described above, an average thickness $G_U$ of the region of a side wall which extends from a position corresponding to a widest portion of the tire toward a tread and that $G_L$ of the region of the side wall which extends from the same position toward a bead are set different from each other, the average thickness $G_U$ of the tread-side region being set to not less than 2.5 mm with the average thickness $G_L$ of the bead-side region set to less than 2.5 mm and not less than 1.0 mm. Therefore, the weight of the pneumatic tire can be reduced without causing a decrease in the cutting resistance of the side walls.

EXAMPLES (Experiment 1)

Figure 8:
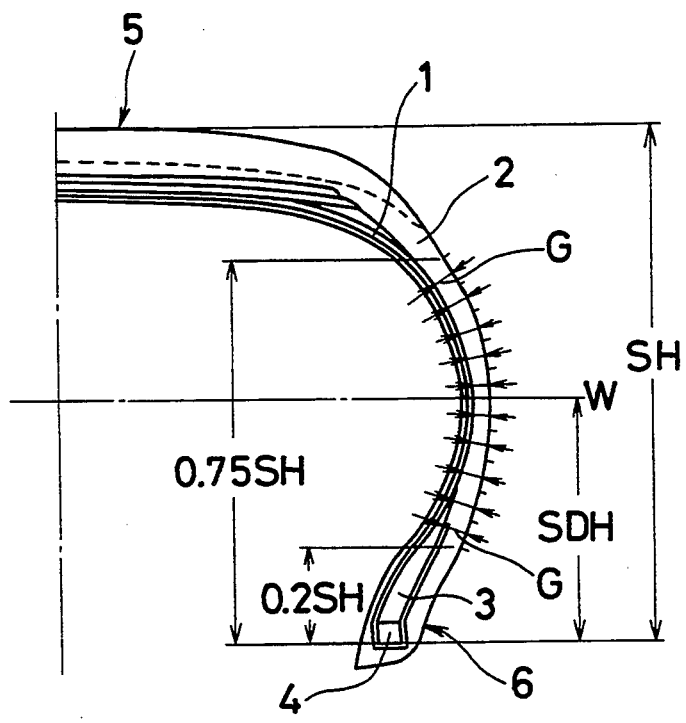
FIG. 8 is a sectional view of a conventional pneumatic tire.

Five types of pneumatic tires (comparative tire 1–5) having a tire size of 175/70R13 were produced with the side wall thickness G which is shown in FIG. 8 set variously. These comparative tires 1–5 were subjected to an edge stone run-over test described below, and the weight reduction indexes were determined. The results are shown in Table 1.

Figure 7:
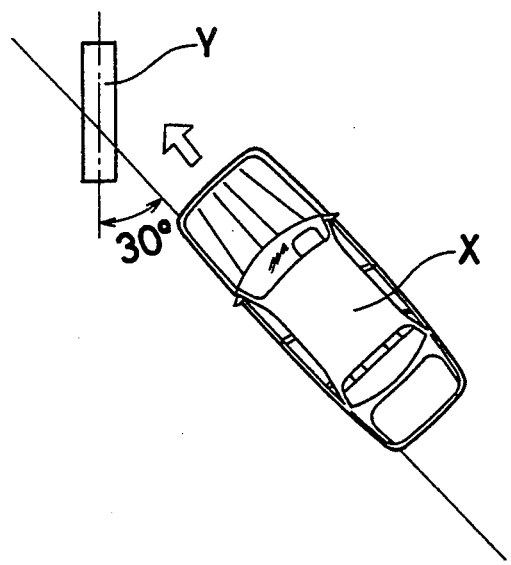
FIG. 7 is a schematic diagram showing an edge stone run-over test.

Edge stone run-over test:

The experimental tires were attached to a 1500 cc miniaturized passenger car X (having a rim size of 13×5J), and the air pressure therein was set to 2.0 kg/cm². As shown in FIG. 7, the car ran over a steel edge stone Y of 100 mm in height at an angle of approach of 30°. During the tests, the speed of the car was increased in a stepped manner by 2.5 km/h from 10 km/h, and a speed at which a side wall was broken was determined as a limit projection run-over speed.

Weight reduction index:

The weight of the portion of a side wall which extended from a position thereon the height of which was 20% of that SH of a cross section of the tire to a position thereon the height of which was 75% of the height SH was determined, and this weight was shown by an index. The smaller the value of this index is, the higher the degree of reduction of weight of the side wall is.

TABLE 1

|  | Comparative tire 1 | Comparative tire 2 | Comparative tire 3 | Comparative tire 4 | Comparative tire 5 |
| --- | --- | --- | --- | --- | --- |
| G (mm) | 3.5 | 3.0 | 2.8 | 2.5 | 2.0 |
| Limit projection run-over speed (km/h) | 22.5 | 20.0 | 20.0 | 20.0 | 17.5 |
| Weight reduction index | 100 | 91 | 86 | 78 | 68 |

Table 1 clearly shows that, when the thickness G of the side wall was reduced uniformly, the cutting resistance lowered due to the decrease in the weight, and that, when the thickness G was set to 2.0 mm, the limit projection run-over speed became as low as 17.5 km/h.

(Experiment 2)

Five types of pneumatic tire (tires 1–3 according to the present invention and comparative tires 6 and 7) having a tire size of 175/70R13 were produced with the average thicknesses $G_U$, $G_L$ which are shown in FIG. 1 of the tread-side and bead-side regions of side walls set variously. These tires 1–3 according to the present invention and comparative tires 6 and 7 were subjected to an edge stone run-over test described above, and the weight reduction indexes were determined.

The results are shown in Table 2.

TABLE 2

|  | Comparative tire 6 | Tire 1 according to the present invention | Tire 2 according to the present invention | Tire 3 according to the present invention | Comparative tire 7 |
| --- | --- | --- | --- | --- | --- |
| $G_U$ (mm) | 2.5 | 2.5 | 2.5 | 2.5 | 2.5 |

TABLE 2-continued

|  | Comparative tire 6 | Tire 1 according to the present invention | Tire 2 according to the present invention | Tire 3 according to the present invention | Comparative tire 7 |
|---|---|---|---|---|---|
| $G_L$ (mm) | 2.5 | 2.0 | 1.5 | 1.0 | 0.5 |
| Limit projection run-over speed (km/h) | 20.0 | 20.0 | 20.0 | 20.0 | 15.0 |
| Weight reduction index | 100 | 88 | 77 | 65 | 54 |

In the tire 1–3 according to the present invention, the average thickness $G_U$ of the tread-side region of the side walls is 2.5 mm, and that $G_L$ of the bead-side region thereof less than 2.5 mm and not less than 1.0 mm. Therefore, the weight of the side walls could be reduced as is clear from Table 2, without causing the cutting resistance of the side walls to decrease. However, the comparative tire 7 in which the average thickness $G_L$ of the bead-side region of the side walls was set to 0.5 mm had a good weight reduction index but the cutting resistance of the side walls lowered.

(Experiment 3)

Four types of pneumatic tires (comparative tires 8–11) having a tire size of 175/70R13 were produced by using compounds A–D shown in Table 3, as rubber constituting side wall shown in FIG. 8. These comparative tires 8–11 were subjected to an edge stone run-over test described above, and the results are shown in Table 4. The loss factors tan δ of the compounds A–D were determined by using a viscoelasticity spectrometer (manufactured by the Iwamoto Seisakusho, K.K.) under the conditions including a temperature of 20° C., a frequency of 20 Hz, initial strain of 10% and dynamic strain of ±2%.

TABLE 3

|  | Compound | | | |
|---|---|---|---|---|
|  | A | B | C | D |
| tan δ | 0.18 | 0.25 | 0.16 | 0.11 |
| Composition (parts by weight) | | | | |
| Natural rubber | 40 | 40 | 40 | 40 |
| Butadiene rubber | 60 | 60 | 60 | 60 |
| HAF carbon | 40 | 55 | 35 | — |
| GPF carbon | — | — | — | 35 |
| ZnO | 3.0 | 3.0 | 3.0 | 3.0 |
| Stearic acid | 1.0 | 1.0 | 1.0 | 1.0 |
| Age resistor | 3.0 | 3.0 | 3.0 | 3.0 |
| Wax | 1.0 | 1.0 | 1.0 | 1.0 |
| Aroma oil | 10 | 13 | — | — |
| Sulfur | 1.8 | 1.8 | 1.8 | 1.8 |
| Vulcanization acceleration NS | 0.4 | 0.4 | 0.4 | 0.4 |
| Vulcanization acceleration DM | 0.4 | 0.4 | 0.4 | 0.4 |

TABLE 4

|  | Comparative tire 8 | Comparative tire 9 | Comparative tire 10 | Comparative tire 11 |
|---|---|---|---|---|
| tan δ | 0.18 | 0.25 | 0.16 | 0.11 |
| G (mm) | 2.5 | 2.5 | 2.5 | 2.5 |
| Limit projection run-over speed (km/h) | 20.0 | 25.0 | 20.0 | 17.5 |

As is clear from Table 4, the cutting resistance of the side walls tends to increase in proportion to the loss factor tan δ of the rubber constituting the side walls. When the loss factor tan δ was 0.11, the limit projection run-over speed became as low as 17.5 km/h.

What is claimed is:

1. A pneumatic tire comprising a tread, side walls continuing from the left and right sides of said tread, and bead portions continuing from both ends of said side walls, an average tread-side region thickness $G_U$ of the region of each of said side walls which extends from a position corresponding to a widest portion of said tire toward said tread and an average bead-side region thickness $G_L$ of the region of said side walls which extends from said position toward a bead being set different from each other, said average tread-side region thickness $G_U$ and said average bead-side region thickness $G_L$ being determined by dividing the radial extent of both the tread-side region and the bead side region into ten equal parts, measuring the thickness of rubber or each divisional part along a line which passes a circumferentially intermediate point in each divisional part and reaches the surface of a composite member thereunder, and arithmetically averaging the thickness of rubber of the fiber points in the tread-side region to calculate the average tread-side region thickness $G_U$ and arithmetically averaging the five points in the bead-side region to calculate the average bead-side region thickness $G_L$, said average tread-side region thickness $G_U$ of said tread-side region being set to not less than 2.5 mm with said average bead-side region thickness $G_L$ of said bead-side region set to less than 2.5 mm and not less than 1.0 mm, wherein a stepped portion is provided between said tread-side and bead-side regions of said side walls, a recess continuing from said stepped portion being formed in said bead-side region.

2. A pneumatic tire according to claim 1, wherein said stepped portion is provided in the portion of said side walls which extends between the inner edge of a bead core and a position on said side walls the height of which is in the range of 20–60% of that of a cross section of said tire.

3. A pneumatic tire according to claim 1, wherein said average thickness $G_U$ of said tread-side region of said side walls is set to not more than 2.8 mm.

4. A pneumatic tire according to claim 1, wherein a loss factor tan δ of the rubber constituting said side walls is set to a level in the range of 0.05–0.30.

5. A pneumatic tire according to claim 1, wherein a loss factor tan δ of the rubber constituting said side walls is set to a level in the range of 0.13–0.30.

* * * * *

UNITED STATES PATENT AND TRADEMARK OFFICE
CERTIFICATE OF CORRECTION

PATENT NO. : 5,385,192
DATED : January 31, 1995
INVENTOR(S) : Yoshiaki HASHIMURA et al It is certified that error appears in the above-identified patent and that said Letters Patent is hereby corrected as shown below:

In Claim 1, Column 6, Line 30, change "or" to -- of --.

In Claim 1, Column 6, Line 34, change "fiber" to -- five --.

Signed and Sealed this

First Day of August, 1995

Attest:

BRUCE LEHMAN

Attesting Officer       Commissioner of Patents and Trademarks